United States Patent
Obodo

(10) Patent No.: US 10,126,422 B1
(45) Date of Patent: Nov. 13, 2018

(54) VEHICLE BLIND SPOT SENSOR

(71) Applicant: Leonard Obodo, Knightdale, NC (US)

(72) Inventor: Leonard Obodo, Knightdale, NC (US)

( * ) Notice: Subject to any disclaimer, the term of this patent is extended or adjusted under 35 U.S.C. 154(b) by 372 days.

(21) Appl. No.: 15/208,195

(22) Filed: Jul. 12, 2016

(51) Int. Cl.
| | |
|---|---|
| *G01S 13/93* | (2006.01) |
| *B60Q 9/00* | (2006.01) |
| *G08G 1/16* | (2006.01) |
| *B60R 16/033* | (2006.01) |
| *G01S 13/58* | (2006.01) |
| *B60Q 1/26* | (2006.01) |
| *B60R 1/00* | (2006.01) |

(52) U.S. Cl.
CPC ............ *G01S 13/931* (2013.01); *B60Q 9/008* (2013.01); *B60R 16/033* (2013.01); *G01S 13/582* (2013.01); *G08G 1/16* (2013.01); *B60Q 1/2665* (2013.01); *B60R 1/006* (2013.01); *G01S 2013/9332* (2013.01); *G08G 1/167* (2013.01)

(58) Field of Classification Search
CPC .......... G08G 1/167; G08G 1/166; G08G 1/16; G08G 1/09623; B60Q 9/008; B60Q 1/2665; B60Q 9/006; B60Q 1/525; B60R 1/00; B60R 2001/1223; B60R 1/12; B60R 2001/1253; B60R 1/006; B60R 1/081; G01S 2013/9332; G01S 13/931; G01S 2013/9317; G01S 2013/9378; G01S 2013/9385; B60W 30/12; B60W 2550/10; B60W 2420/42; B60W 2420/52; B60W 2550/30; B60W 2050/143; B60W 2550/308
See application file for complete search history.

(56) References Cited

U.S. PATENT DOCUMENTS

| | | | | |
|---|---|---|---|---|
| 5,530,447 A | * | 6/1996 | Henderson | G01S 13/931 340/904 |
| 6,172,613 B1 | * | 1/2001 | Deline | B60K 35/00 248/549 |
| 6,193,380 B1 | * | 2/2001 | Jacobs | B60R 1/025 340/903 |
| 6,363,326 B1 | | 3/2002 | Scully | |
| 7,404,654 B2 | * | 7/2008 | Lueftner | B60Q 1/2665 362/140 |

(Continued)

FOREIGN PATENT DOCUMENTS

| | | | | |
|---|---|---|---|---|
| EP | 2380776 A2 | * | 10/2011 | B60R 1/08 |
| EP | 23380776 A3 | | 7/2012 | |

*Primary Examiner* — Olumide Ajibade Akonai
(74) *Attorney, Agent, or Firm* — Kyle A. Fletcher, Esq.

(57) ABSTRACT

The vehicle blind spot sensor is a device that secures itself against a portion of a side view mirror in order to detect the presence of other motorists in the side view mirror. The vehicle blind spot sensor includes a plurality of sensors that detect the presence of another motorist that is either approaching or located within a respective blind spot of the respective vehicle. The plurality of sensors additionally determine the distance from the vehicle blind spot sensor to the other motorist that has been detected, and displays this information on a digital display that is visible to a driver of the respective vehicle. The digital display is located on a portion of the surface of the housing that is affixed to the side view mirror. One of the plurality of sensors is used to detect an approaching speed of the other motorist that has been detected.

15 Claims, 5 Drawing Sheets

(56) References Cited

U.S. PATENT DOCUMENTS

| | | | | |
|---|---|---|---|---|
| 7,492,281 | B2* | 2/2009 | Lynam | B60Q 1/2665 |
| | | | | 340/904 |
| 7,517,099 | B2* | 4/2009 | Hannah | B60Q 1/2665 |
| | | | | 340/463 |
| 8,564,425 | B2 | 10/2013 | Al-Jafar | |
| 9,035,754 | B2 | 5/2015 | Lynam | |
| 9,056,584 | B2 | 6/2015 | Fish, Jr. | |
| 2001/0039475 | A1* | 11/2001 | McCarthy | B60R 1/12 |
| | | | | 701/468 |
| 2010/0220406 | A1 | 9/2010 | Cuddihy | |
| 2011/0260845 | A1 | 10/2011 | Henion | |
| 2013/0113923 | A1* | 5/2013 | Chien | B60R 1/00 |
| | | | | 348/135 |
| 2017/0267173 | A1* | 9/2017 | Goo | B60K 35/00 |

* cited by examiner

VEHICLE BLIND SPOT SENSOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular accessories, more specifically, a blind spot sensor that is mountable on a side view mirror in order to provide real-time feedback as to the presence of another motorist in a blind spot relationship with the respective vehicle.

Vehicular accidents that result during a lane change have been problematic for as long as cars have been around. An improvement to vehicles was the advent of side view mirrors. However, side view mirrors do not always enable a driver to discern if another motorist is in a blind spot. A variety of technologies have attempted to address this problem.

The device of the present application seeks to overcome the issue of blind spots by providing an accessory that secures itself to a portion of the side view mirror, and which detects and provides user feedback as to the presence or lack thereof of other motorists in a blind spot.

SUMMARY OF INVENTION

The vehicle blind spot sensor is a device that secures itself against a portion of a side view mirror in order to detect the presence of other motorists in the side view mirror. The vehicle blind spot sensor includes a plurality of sensors that detect the presence of another motorist that is either approaching or located within a respective blind spot of the respective vehicle. The plurality of sensors additionally determine the distance from the vehicle blind spot sensor to the other motorist that has been detected, and displays this information on a digital display that is visible to a driver of the respective vehicle. The digital display is located on a portion of the surface of the housing that is affixed to the side view mirror. One of the plurality of sensors is used to detect an approaching speed of the other motorist that has been detected so as to provide this information on the digital display. Alternative embodiments would generate a blinking light that attracts the attention of the driver in order to alert s/he to the presence of the other motorist that has been detected.

It is an object of the invention to provide a device that is able to affix itself to a portion of a surface of a side view mirror, and which detects and generates data that is displayed for a driver as it relates to other motorists in and around a blind spot of a respective vehicle.

Another object of the invention is to provide a blind spot sensor that alerts the driver so as to prevent vehicle accidents attributed with lane changing with other motorists in a blind spot.

A further object of the invention is to provide a blind spot sensor that is able to alert the driver as to the detection of another motorist in a blind spot.

An even further object of the invention is to provide a blind spot sensor that is able to provide a distance from the other motorist to the respective vehicle.

An even further object of the invention is to provide a blind spot sensor that is able to provide a speed of the other motorist as it approaches the respective vehicle along the bind spot.

Another object of the invention is to provide an accessory that is adapted for use with an existing vehicle, and which is able to operate independently and without any retrofitting of the respective vehicle.

These together with additional objects, features and advantages of the vehicle blind spot sensor will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle blind spot sensor in detail, it is to be understood that the vehicle blind spot sensor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle blind spot sensor.

It is therefore important that the claims be regarded as including such equivalent construction insofar as they do not depart from the spirit and scope of the vehicle blind spot sensor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
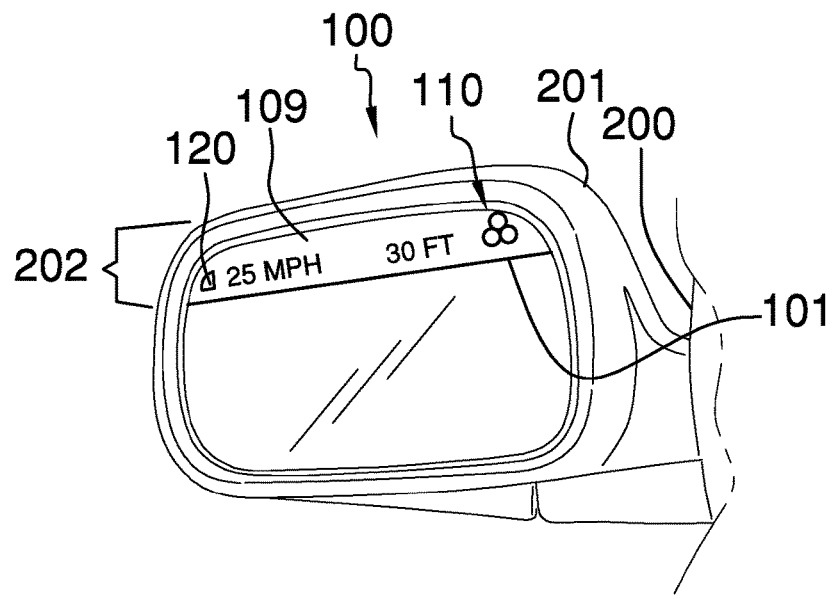
FIG. 1 is a view of an embodiment of the disclosure in use.
Figure 2:
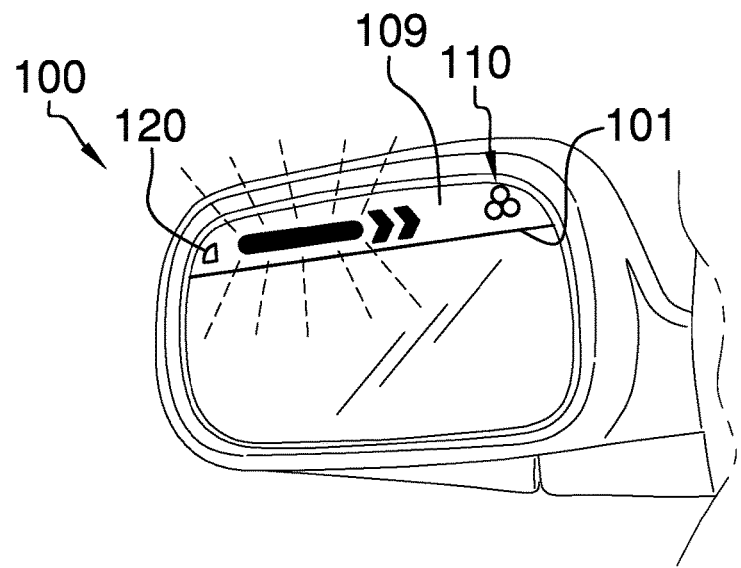
FIG. 2 is another view of an embodiment of the disclosure in use.
Figure 3:
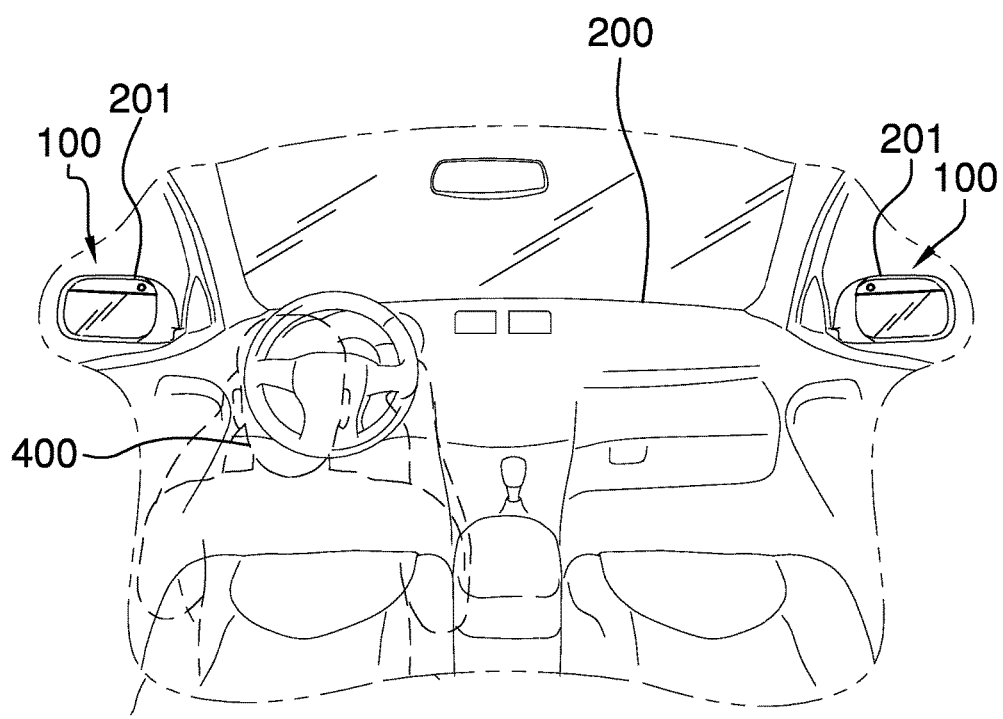
FIG. 3 is another view of an embodiment of the disclosure in use.
Figure 4:
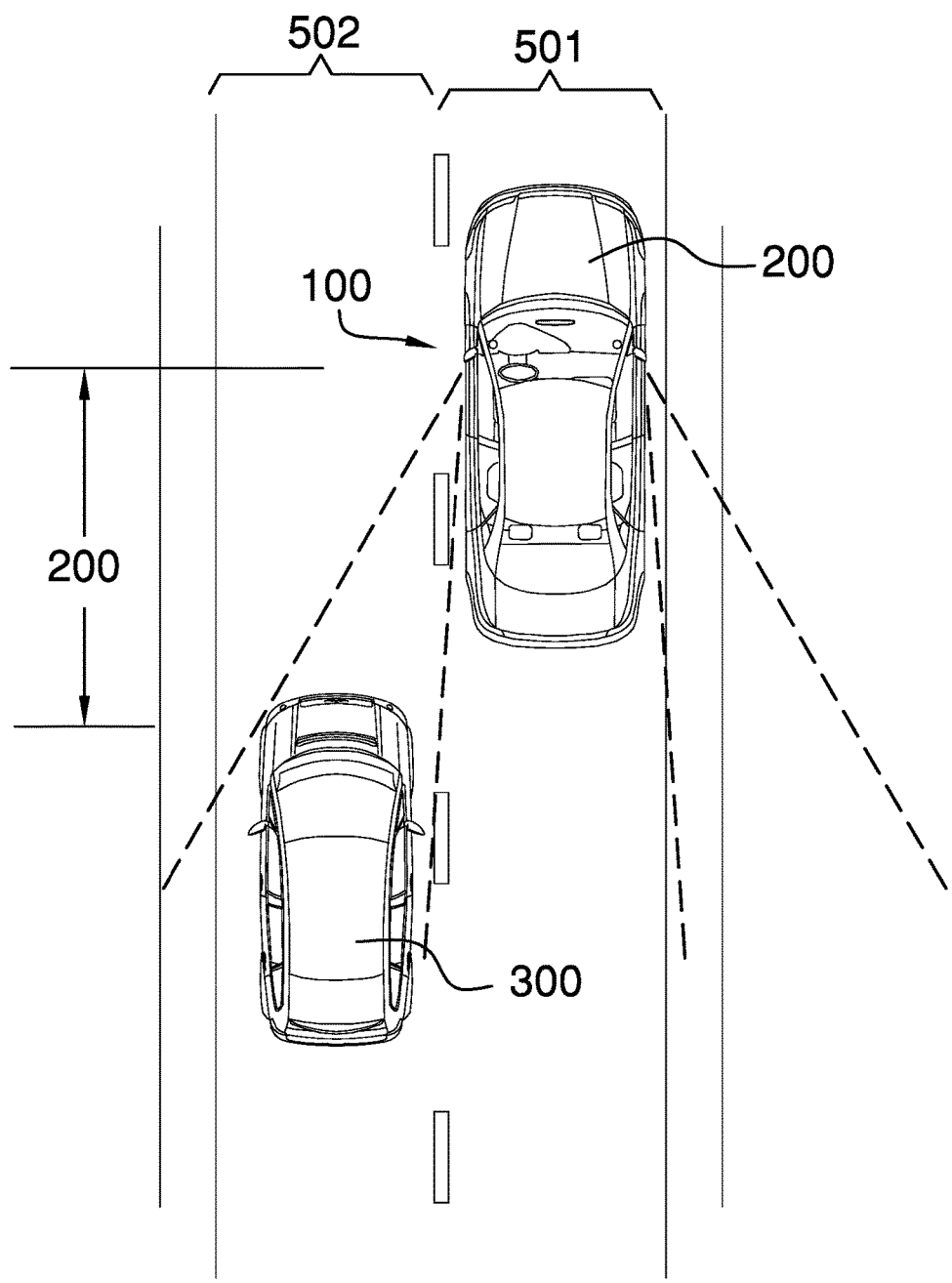
FIG. 4 is a top view of vehicles associated with an embodiment of the disclosure in use.
Figure 5:
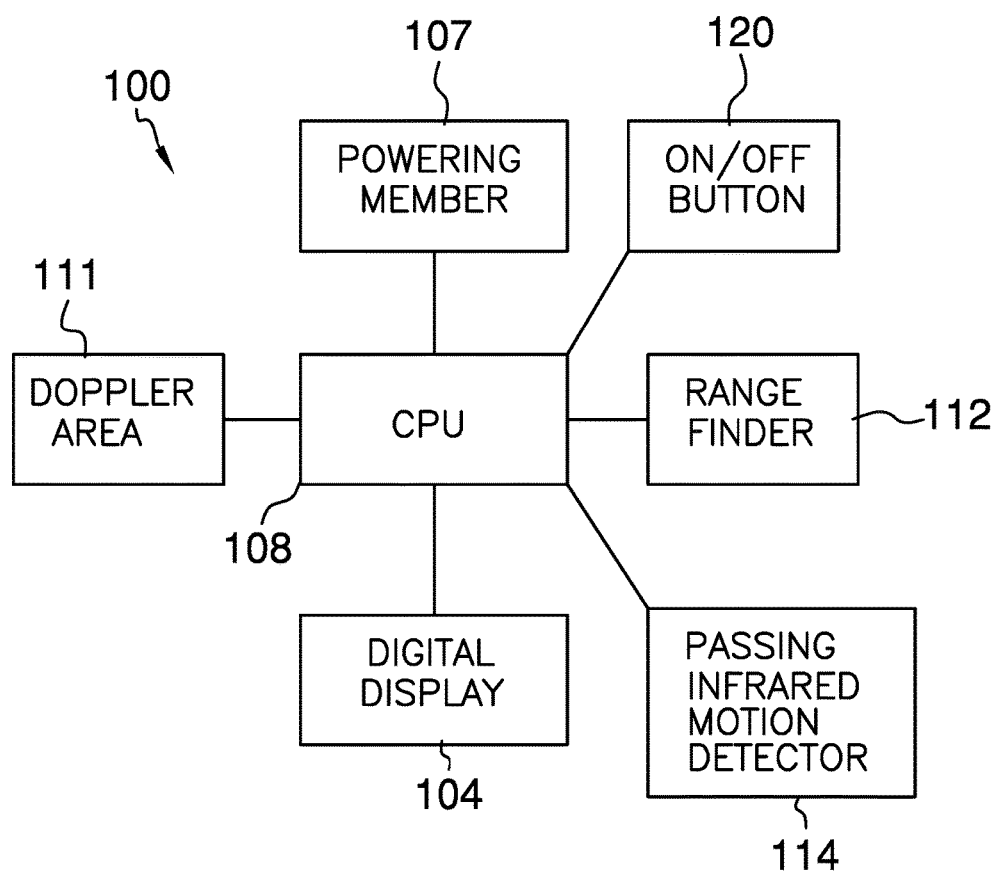
FIG. 5 is a block diagram of componentry associated with an embodiment of the disclosure.
Figure 6:
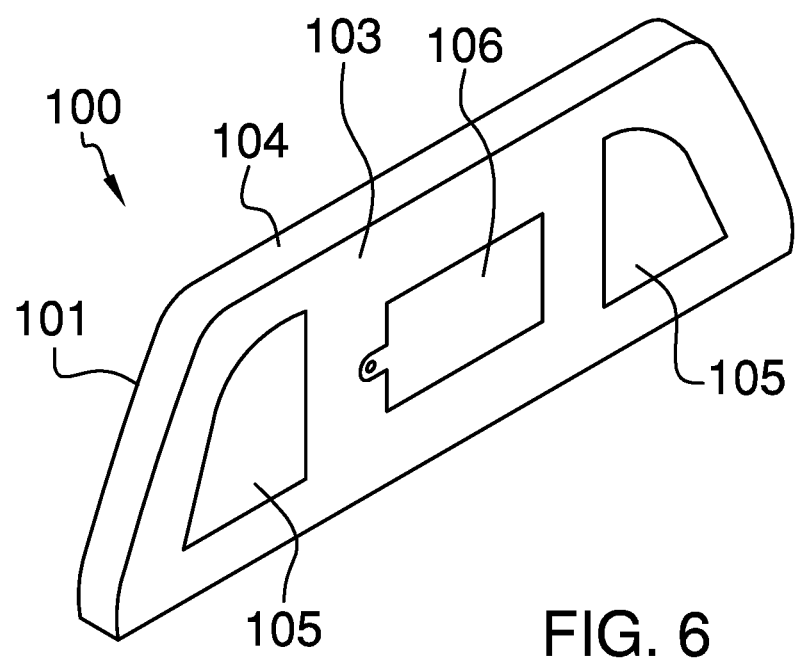
FIG. 6 is a rear, perspective view of a housing associated with an embodiment of the disclosure.

Detailed reference will now be made to one or more potential embodiments of the disclosure, which are illustrated in FIGS. 1 through 6.

The vehicle blind spot sensor 100 (hereinafter invention) comprises a housing 101 that is adapted to be affixed against a side view mirror 201 of a vehicle 200. The housing 101 is further defined with a rear surface 102, a front surface 103, and a peripheral surface 104. The rear surface 102 of the housing 101 includes at least one adhering member 105 that is adapted to affix the housing 101 against the side view mirror 201. It shall be noted that the housing 101 is depicted with a size and shape that is adapted to correlate with an upper portion 202 of the side view mirror 201.

The rear surface 102 may include a battery compartment cover 106 that when removed provides access to a powering member 107 seated therein. The powering member 107 is wired to a central processing unit 108. The powering member 107 is being used to refer to at least one battery, which provides the electrical needs for the invention 100. The central processing unit 108 is responsible for all functionally attributed with the invention 100. The central processing unit 108 is housing within the housing 101. Moreover, the central processing unit 108 is wired to a digital display 109 located on the front surface 103 of the housing 101.

The central processing unit 108 is also wired to a plurality of sensors 110. The plurality of sensors 110 are located on the front surface 102 and merge with the digital display 109. The plurality of sensors 110 include, but are not limited to, a Doppler radar 111, a range finder 112, and a passive infrared motion detector 113. The Doppler radar 111 is a known technology and is used to determine speed of another motorist 300. The range finder 112 is a known technology, and is used to detect relative distance 114 between the housing 101 and the motorist 300. The passive infrared motion detector 113 is a known technology, and is used to detect the presence of the motorist 300.

The range finder 112 may employ a laser rangefinder, which uses a laser beam to determine the relative distance 114 to the motorist 300. The most common form of laser rangefinder operates on the time of flight principle by sending a laser pulse in a narrow beam towards the motorist 300 and measuring the amount of time taken by the pulse to be reflected off the motorist and returned to the range finder 112. A common example of a range finger is one that is used for golf where an end user points the range finder at an object in order to determine distance to said object for the purpose of how far to hit a golf ball.

The Doppler radar 111 may employ a specialized radar gun that uses the Doppler effect to produce velocity data about the motorist 300 at a distance. It does this by bouncing a microwave signal off a desired target (the motorist 300) and analyzing how the object's motion (movement of the motorist 300) has altered the frequency of the returned signal. This variation gives direct and highly accurate measurements of the radial component of a target's velocity (motorist's velocity) relative to the radar (vehicle 200).

The passive infrared motion detector 113 is typically seen in burglar alarms and automatically-activated lighting systems. A PIR-based motion detector is used to sense movement of people, animals, or other objects. Infrared radiation enters through the front of the sensor, known as the 'sensor face'. At the core of a PIR sensor is a solid-state sensor or set of sensors, made from pyroelectric materials-materials, which generate energy when exposed to heat. Typically, the sensors are approximately ¼ inch square (40 mm$^2$), and take the form of a thin film. The sensor is often manufactured as part of an integrated circuit.

The invention 100 may include an on/off button 120 that is wired to the central processing unit 108. The on/off button 120 may be located on the front surface 102 of the housing 101 in order to provide ease of access. Optionally, the passive infrared motion detector 113 could signal the central processing unit 108 to turn on/off the invention 100.

The digital display 109 may encompass a majority of the front surface 102 of the housing 101. Moreover, the digital display 109 is used to provide data information in the form of a speed 121, distance 122, or blinking alert 123. Moreover, the speed 121 indicates the relative velocity of the motorist 300 with respect to the invention 100 and the vehicle 200. The distance 122 corresponds with the relative distance 114. The blinking alert 123 is used to attract the attention of a driver in order to warn said driver 400 that the invention 100 has actually detected the presence of the motorist 300. Since, the housing 101 is provided on the side view mirror 201, the digital display 109 provides data information to the driver where the driver would normally look at the side view mirrors 201 prior to changing from a first lane 501 to a second lane 502.

It shall be noted that the central processing unit 108 would first require the detection of the motorist 300 to occur via the passive infrared motion detector 114 prior to initiating use of the range finder 112 and the Doppler radar 111. The detection of the motorist 300 via the passive infrared motion detector 114 may initiate the blinking alert 123 onto the digital display 109 first, and then the speed 121 and the distance 122 are displayed second, via the Doppler radar 111 and the range finder 112.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A vehicular blind spot sensor comprising:
a housing that is adapted to be affixed to a side view mirror of a vehicle;
wherein the housing includes a plurality of sensors to adaptively detect the presence of another motorist, determine relative velocity and distance of said motorist with respect to said housing;
wherein the housing includes a digital display to provide data information of the existence of said motorist, relative velocity and distance of said motorist with respect to said housing.

2. The vehicular blind spot sensor according to claim 1 wherein the housing is further defined with a rear surface, a front surface, and a peripheral surface.

3. The vehicular blind spot sensor according to claim 2 wherein the rear surface of the housing includes at least one adhering member that is adapted to affix the housing against the side view mirror.

4. The vehicular blind spot sensor according to claim 3 wherein the housing is further defined with a size and shape that is adapted to correlate with an upper portion of the side view mirror.

5. The vehicular blind spot sensor according to claim 4 wherein the rear surface includes a battery compartment cover that when removed provides access to a powering member seated therein.

6. The vehicular blind spot sensor according to claim 5 wherein the powering member is wired to a central processing unit; wherein the powering member is being used to refer to at least one battery, which provides the electrical needs for the central processing unit; wherein the central processing unit is responsible for all functionally attributed with the vehicular blind spot sensor.

7. The vehicular blind spot sensor according to claim 6 wherein the central processing unit is housing within the housing; wherein the central processing unit is wired to said digital display located on the front surface of the housing.

8. The vehicular blind spot sensor according to claim 7 wherein the central processing unit is also wired to the plurality of sensors.

9. The vehicular blind spot sensor according to claim 8 wherein the plurality of sensors are located on the front surface and merge with the digital display.

10. The vehicular blind spot sensor according to claim 9 wherein the plurality of sensors is further defined to include a Doppler radar; wherein the Doppler radar is adapted to determine a relative velocity between the motorist and the vehicle.

11. The vehicular blind spot sensor according to claim 10 wherein the plurality of sensors is further defined to include a range finder; wherein the range finder is adapted to determine a relative distance between the housing and the motorist.

12. The vehicular blind spot sensor according to claim 11 wherein the plurality of sensors is further defined to include a passive infrared motion detector; wherein the passive infrared motion detector is adapted to determine the presence of the motorist with respect to a blind spot of said vehicle.

13. The vehicular blind spot sensor according to claim 12 wherein an on/off button is wired to the central processing unit; wherein the on/off button is located on the front surface of the housing.

14. The vehicular blind spot sensor according to claim 13 wherein the digital display encompasses a majority of the front surface of the housing; wherein the digital display is used to provide data information in the form of a speed, distance, or blinking alert; wherein the speed indicates the relative velocity of the motorist with respect to the housing and the vehicle; wherein the distance corresponds with the relative distance; wherein the blinking alert is adapted to be used to attract the attention of a driver in order to warn said driver that the vehicular blind spot has actually detected the presence of the motorist.

15. The vehicular blind spot sensor according to claim 14 wherein the central processing unit would first require the detection of the motorist to occur via the passive infrared motion detector prior to initiating use of the range finder and the Doppler radar; wherein the detection of the motorist via the passive infrared motion detectors initiate the blinking alert onto the digital display first, and then the speed and the distance are displayed second, via the Doppler radar and the range finder.

\* \* \* \* \*